Oct. 25, 1966   D. L. CARRIERE   3,280,948
FLUID AND MECHANICAL CLUTCH FAN DRIVE
Filed Oct. 26, 1964
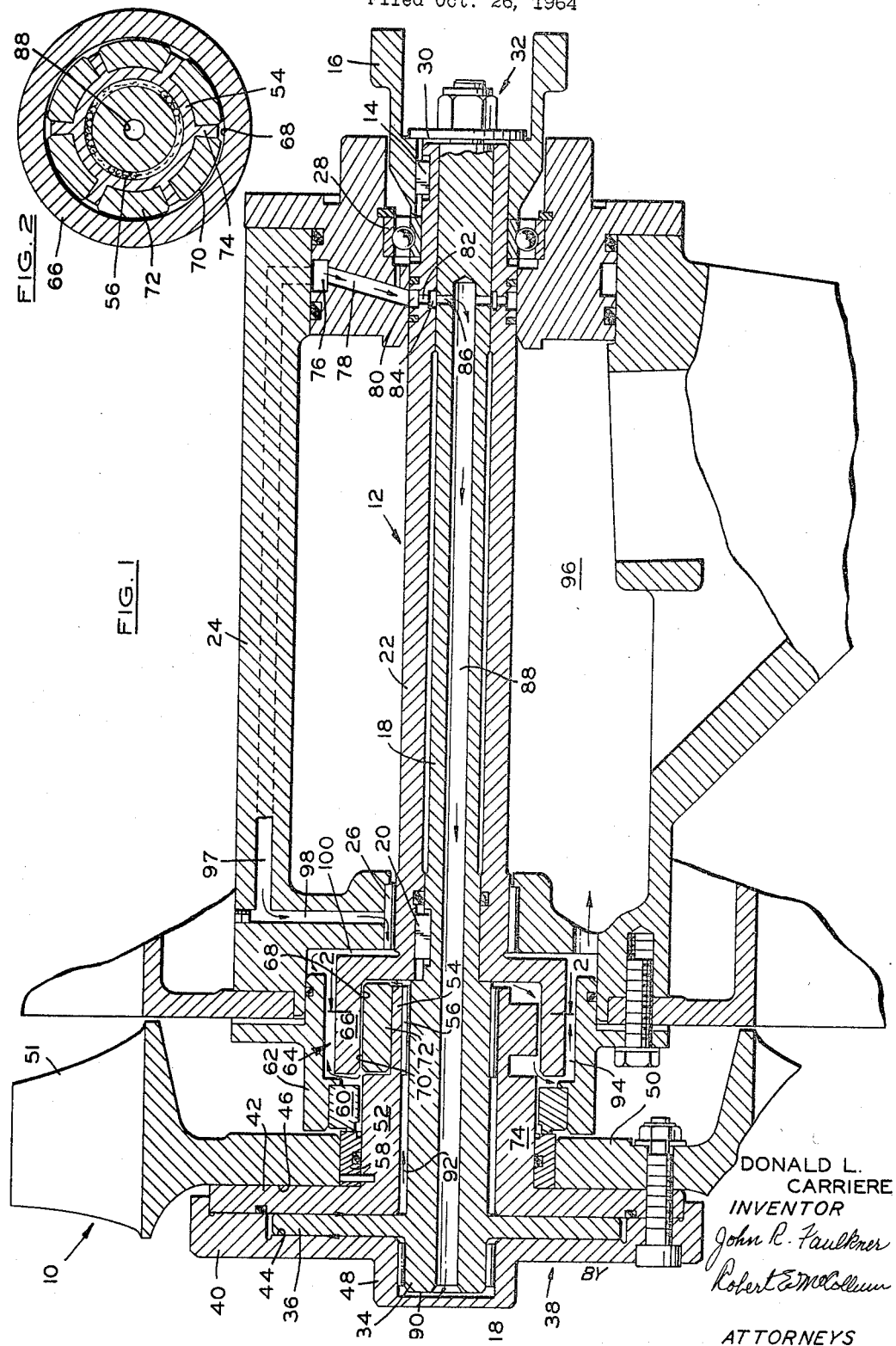
DONALD L.
CARRIERE
INVENTOR
John R. Faulkner
Robert E. McCollum
BY
ATTORNEYS 3,280,948
FLUID AND MECHANICAL CLUTCH FAN DRIVE
Donald L. Carriere, Highland Park, Mich., assignor to Ford Motor Company, Dearborn, Mich., a corporation of Delaware
Filed Oct. 26, 1964, Ser. No. 406,412
6 Claims. (Cl. 192—48)

This invention relates to an automatic clutch mechanism. More particularly, it relates to a drive mechanism for the fan of a gas turbine engine intercooler.

Many gas turbine engines having intercoolers between the compressor stages force cooling air through the intercooler by a fan driven by the first stage compressor. If the vehicle is of a type such as, for example, a tank, it must be capable of operating partially or completely submerged in water as well as on land. When the tank suddenly enters the water, the great increase in resistance to rotation of the fan blades by the water causes an excessive rise in fan power requirements, resulting frequently in fan driveline failure or adverse gas turbine engine operating conditions.

The invention relates to a clutching mechanism for automatically providing a nonslip high speed drive of a fan while operating on land, and a slip drive of the fan when excessive loads are placed on it. Rupturing of the fan drive shaft, and adverse gas turbine engine operating conditions are, therefore, obviated.

One of the objects of the invention, therefore, is to provide a clutch mechanism for automatically initiating and maintaining a drive between two members, while permitting slippage between the members when excessive loads are imposed on the driven member.

Another object of the invention is to provide a driving mechanism for the fan of a gas turbine engine intercooler that normally maintains the fan at the constant speed of its drive shaft, and yet permits the fan to be stopped upon a predetermined increase in load on the fan, without damaging the drive shaft.

It is a further object of the invention to provide a fan drive consisting of a viscous friction clutch for providing initial acceleration of the fan through the agency of a thin film of fluid, and a speed responsive clutch member for finally engaging the drive and driven members of the clutch to reduce power losses through the viscous clutch, the speed responsive clutch disengaging in response to an excessive load on the fan whereby a slip drive with low power losses is provided by the viscous clutch.

A still further object of the invention is to provide a drive mechanism for the fan of a gas turbine engine intercooler that permits substantially constant speed operation of the fan when the vehicle in which it is installed is operating above water, and substantially frees the fan from its drive shaft when the vehicle and fan become partly or completely submerged in water.

It is a still further object of the invention to provide a fan drive of the type described above in which the initial drive of the fan is provided by a viscous friction clutch, the adjacent surfaces of which are lubricated and cooled by the lubricating oil from the engine to limit temperature rise during slippage of the clutch.

Other objects, features and advantages will become apparent upon reference to the succeeding, detailed description of the invention and to the drawings illustrating a preferred embodiment thereof; wherein, FIGURE 1 is a cross-sectional view of one form of mechanism embodying the invention, and FIGURE 2 is a cross-sectional view taken on a plane indicated by and viewed in the direction of arrows 2—2 of FIGURE 1.

FIGURE 1 shows the drive mechanism for the fan 10 of an intercooler located between compressor stages of a gas turbine engine. A drive shaft 12 has a keyed connection 14 at one end to a yoke-shaped flange 16. The flange is adapted to be connected to the rotor shaft of a gas turbine engine compressor, for example.

The drive shaft 12 consists of a central longitudinally extending portion 18 that is keyed at 20 to a surrounding sleeve portion 22. The shafts are rotatably supported at opposite ends within a stationary housing 24 by suitable bearing members 26 and 28. A face plate 30, and nut and bolt connection 32 axially locate the shaft portions against bearing 28.

The left-hand end 34 of shaft portion 18 has an annular flange or disc 36 extending radially from it to constitute the driving member of a viscous friction clutch unit 38. The disc 36 is enclosed by two disc-like members 40 and 42 that are bolted together as shown to have friction surfaces 44 and 46 closely adjacent opposite sides of disc 36. The disc 40 has a hub 48 that is rotatably journaled on shaft 18, as shown, and also acts as a cover to seal this end of the shaft. In addition to being bolted together, discs 40 and 42 are also bolted to the annular rotor 50 of fan 10. The fan has a number of circumferentially spaced blades 51.

Viscous friction clutch 38 operates in a known manner causing a drive of discs 40 and 42 by disc 36 through the agency of a thin film of fluid such as oil between their mutually adjacent surfaces. The oil is continuously supplied to the surfaces by means to be described later. The clutch has a predetermined low torque capacity to permit slippage between the discs at the desired time. In operation, initial acceleration of fan 10 is provided by the driving of disc 36 when fan 10 is substantially free of load, such as when it is to be operated in air. Substantially little slippage occurs between discs 36, 40 and 42 at this time. If an excessive load is placed on fan 10, such as when the fan blades suddenly become submerged in water, the torque capacity of clutch 38 is exceeded, and the discs 40 and 42 slip relative to the driving disc 36. Since the engaging surfaces of the discs are lubricated and cooled, however, by means to be described later, the heat generated during slippage is carried away. Thus, clutch 38 normally provides substantially a non-slip constant speed drive between shaft 12 and fan 10, but permits slippage without excessive power losses upon an excessive load being placed on the fan.

Driven disc 42 has an axially extending hub 52 with a reduced diameter sleeve portion 54 rotatably mounted on drive shaft 18 by bearing member 56. The space between the inner edge of the fan rotor 50 and hub 52 is sealed by an annular member 58. This latter member rubs against a carbon ring type sealing member 60 axially located within an extension 62 of the stationary housing 24.

The sleeve portion 54 of disc 42 constitutes the driven portion of a mechanical speed responsive clutch 64. The clutch includes an outer drum-like member 66 formed as a radially offset extension of driving sleeve shaft 22. Extension 66 has an inner friction surface 68 adapted to cooperate with the outer friction surface 70 of a number of spaced centrifugally responsive clutch shoe members 72. These shoes are radially slidably contained between circumferentially spaced spokes 74 extending radially from the driven clutch sleeve portion 54. A slight radial clearance, such as, for example, .005–.010 inch, is provided between the adjacent surfaces 68 and 70 of member 66 and the shoe members 72 when the shoes are in their normal innermost position, to maintain the drive and driven members disengaged. This position is attained when sleeve portion 54 is below the speed of shaft 22, or at rest.

In operation, a predetermined rotation of fan 10 by viscous clutch 38 and shaft 18 will cause shoes 72 to move progressively radially outwardly under the effect of centrifugal force until they frictionally engage the inner surface 68 of shaft extension 66, thereby frictionally locking drive sleeve shaft 22 and the fan hub 50 together. This causes fan 10 to be driven at the speed of accessory drive shaft 12 and eliminates the power losses through viscous clutch 38. If suddenly an excessive load should be placed on blades 51 of fan 10, such as would be the case when the vehicle in which the fan is installed is submerged or partly submerged in water, the sudden decrease or even stoppage of rotation of fan 10 and its hub 52 causes the centrifugal shoe members 72 to move radially inwardly by gravity to the position shown in FIGURE 2 where they are out of engagement with the inner surface 68 of the driving shaft extension 66. Clutch 64 then becomes disengaged. Since the torque capacity of viscous clutch 38 is now exceeded, the disc 36 slips relative to the slower moving or stationary discs 40 and 42, but with low power losses. At this time, therefore, the drive shafts 18 and 22 continue to rotate at substantially their same speeds even though fan 10 is not.

Turning now to the lubrication and cooling of viscous clutch 38, the stationary housing 24 is provided with an annular port 76 that is supplied with oil or lubricant from a branch of the engine main lubricating system, not shown. Port 76 is connected by a number of bores 78 to an annular port 80 in sleeve shaft 22. Connecting bore 82, annular port 84, and bore 86 in shaft 18 direct the lubricant-cooling fluid to a central bore 88 in shaft portion 18. The fluid then flows axially through bore 88 and radially outwardly through the annular space 90 between the end of the shaft and the cover hub 48 of disc 40. The flow continues through the journal bearing and radially outwardly between the closely adjacent surfaces of discs 40 and 36, around the edge of disc 36 and radially inwardly again between the surfaces of discs 36 and 42. The fluid then flows axially as indicated by arrows 92 between the hub 52 and shaft portion 18, past bearing 56 to flow outwardly and axially around the centrifugal shoe members 72. The flow then continues through the space 94 between the shaft extension 66 and the stationary housing extension 62 out into the main sump 96, as indicated. Flow is also provided from a parallel path 97 in housing 24 by a cross-connected passage 98 directing flow past bearing 26 to the space 100 between the housing and shaft extension 66.

It will be seen, therefore, that an adequate supply of lubricating and cooling fluid is supplied to the viscous clutch 38 as well as the bearing members at all times, thus assuring the operation of viscous clutch 38 in the manner described by carrying away the heat generated during maximum slippage conditions.

From the foregoing, therefore, it will be seen that the invention provides a fan drive or drive shaft clutching mechanism that permits normal high speed non-slip operation of the fan to provide the necessary air, for example, for cooling the air discharged from the compressor stage of a gas turbine engine; and, that when the fan is operated in water, when cooling of the intercooler air in the same manner is not required, the drive of the fan automatically reverts to a yieldable connection to the drive shaft to prevent rupture of the shaft or adverse gas turbine engine operating conditions. Also, it will be seen that the clutching mechanism is such that the fan is immediately brought up to the speed of the drive shaft as soon as the fan power requirements decrease below the torque capacity of the viscous friction clutch.

While the invention has been illustrated in its preferred embodiment in the figures, it will be clear to those skilled in the arts to which the invention pertains that many changes and modifications may be made thereto without departing from the scope of the invention.

What is claimed is:

1. A clutching mechanism comprising, drive and driven members, and means operably connecting said members for automatically providing a drive or disengagement therebetween in response to changes in relative rotation therebetween, said means including yieldable friction coupling means of predetermined torque capacity having continuously engaged portions, means connecting separate ones of said portions to said drive and driven members for an initial drive between said members, and speed responsive clutch means fixed to said driven member, said latter clutch means having an element movable into essentially non-relatively movable engagement with said drive member in response to a predetermined speed of rotation of said driven member to engage said members.

2. A clutching mechanism comprising, drive and driven members, and means operably connecting said members for automatically providing a drive or disengagement therebetween in response to changes in relative rotation therebetween, said means including a clutch means of predetermined torque capacity having continuously engaged friction elements, means connecting seperate ones of said elements to said drive and driven members for an initial drive therebetween, and additional speed responsive clutch means fixed to said driven member, said latter clutch means having a portion movable into essentially non-relatively movable engagement with said drive member in response to a predetermined speed of rotation of said driven member to engage said members, said portion being movable out of engagement with said driving member upon a decrease in speed of said driven member relative to said driving member.

3. A clutching mechanism comprising, drive and driven members, and means operably connecting said members for automatically providing a drive or disengagement therebetween in response to changes in relative rotation therebetween, said means including a viscous friction clutch of predetermined torque capacity having continuously engaged friction elements adapted to slip relative to each other upon exceeding said torque capacity level, means connecting separate ones of said elements to said drive and driven members for an initial drive therebetween, and mechanical speed responsive clutch means fixed to said driven member, said latter clutch means having a portion movable into engagement with said drive member in response to a predetermined speed of rotation of said driven member to provide an essentially non-relatively movable full engagement between said members, said portion being movable out of engagement with said driving member upon a decrease in speed of rotation of said driven member relative to said drive member, said viscous clutch elements slipping during the relative rotation between said driven and driving members in response to a load on said driven member above said predetermined torque capacity to prevent damage to said driving member.

4. A clutching mechanism comprising, drive and driven members, and means operably connecting said members for automatically providing a drive or disengagement therebetween in response to changes in relative rotation therebetween, said means including a viscous friction clutch of predetermined torque capacity having continuously engaged friction elements adapted to slip relative to each other upon exceeding said torque capacity level, means connecting separate ones of said elements to said drive and driven members for an initial drive therebetween, and mechanical speed responsive clutch means fixed to said driven member, said latter clutch means having a plurality of centrifugally responsive shoes movable into engagement with said drive member in response to a predetermined speed of rotation of said driven member to provide an essentially non-relatively movable full engagement between said members, said shoes being movable out of engagement with said driving member upon a decrease in speed of rotation of said driven member relative to said drive member, said viscous clutch elements slipping during the relative rotation between said driven and driving members in response to a load on said driven member above said predetermined torque capacity to prevent damage to said driving member.

5. A drive mechanism comprising, power input and output shafts, and clutch means operably connecting said output shaft to said drive shaft for automatically providing a drive or non-drive therebetween, said means including a first slippable viscous friction clutch means of predetermined torque capacity having continuously engaged friction elements, means connecting separate ones of said elements to said power input and output shafts for an initial drive between said shafts, and second speed responsive mechanical clutch means fixed to said output shaft, said latter clutch means having centrifugally responsive means movable into frictional engagement with said input shaft in response to a predetermined speed of rotation of said output shaft by said viscous clutch means to provide an essentially non-relatively movable full engagement between said members, said centrifugally responsive means being movable out of engagement with said driving member upon a sudden increase in load on said output shaft above the said predetermined torque capacity to additionally effect slipping of said first clutch means and a non-drive between said shafts.

6. A clutching mechanism comprising, drive and driven members, and means operably connecting said members for automatically providing a drive or disengagement therebetween in response to changes in relative rotation therebetween, said means including a viscous friction clutch of predetermined torque capacity having continuously engaged friction elements adapted to slip relative to each other upon the attainment of said torque capacity level, means connecting separate ones of said elements to said drive and driven members for an initial drive therebetween, and mechanical speed responsive clutch means fixed to said driven member, said latter clutch means having a plurality of centrifugally responsive shoes movable radially outwardly into engagement with said drive member in response to a predetermined speed of rotation of said driven member to provide an essentially non-relatively movable full engagement between said members, said shoes being movable out of engagement with said driving member upon a decrease in speed of rotation of said driven member relative to said drive member, said viscous clutch elements slipping during relative rotation between said driven and driving members in response to a load on said driven member above said predetermined torque capacity to prevent damage to said driving member, a source of fluid under pressure, and means connecting said source and said viscous clutch means for lubricating and cooling the engaging surfaces thereof to carry away the heat generated during slippage between the friction elements thereof.

References Cited by the Examiner

UNITED STATES PATENTS

| | | | |
|---|---|---|---|
| 2,719,616 | 10/1955 | Ahlen | 192—3.2 |
| 3,007,555 | 11/1961 | Eames | 192—11.32 X |
| 3,207,279 | 9/1965 | Ahlen | 192—57 |

FOREIGN PATENTS 227,053  4/1963  Austria.

DAVID J. WILLIAMOWSKY, *Primary Examiner.*

A. T. McKEON, *Assistant Examiner.*